US012692898B2

(12) United States Patent　　(10) Patent No.:　US 12,692,898 B2

Haertel et al.　　(45) Date of Patent:　　Jul. 28, 2026

(54) DOUBLE ROW ANGULAR CONTACT BALL BEARING

(71) Applicant: Schaeffler Technologies AG & Co. KG, Herzogenaurach (DE)

(72) Inventors: Martin Haertel, Stuttgart (DE); Christian Straub, Kempten (DE); Dietmar Rudy, Kleinbundenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 57 days.

(21) Appl. No.: 18/846,722

(22) PCT Filed: Feb. 17, 2023

(86) PCT No.: PCT/DE2023/100131

§ 371 (c)(1),
(2) Date: Sep. 13, 2024

(87) PCT Pub. No.: WO2023/174472

PCT Pub. Date: Sep. 21, 2023

(65) Prior Publication Data

US 2025/0198452 A1　　Jun. 19, 2025

(30) Foreign Application Priority Data

Mar. 15, 2022　(DE) ..................... 10 2022 106 014.4

(51) Int. Cl.
F16C 19/18　　(2006.01)
B23Q 1/26　　(2006.01)
(Continued)

(52) U.S. Cl.
CPC .............. F16C 19/184 (2013.01); B23Q 1/26 (2013.01); F16C 33/586 (2013.01); F16C 33/60 (2013.01);
(Continued)

(58) Field of Classification Search
CPC .... F16C 19/181; F16C 19/182; F16C 19/183; F16C 19/184; F16C 19/52; F16C 33/586;
(Continued)

(56) References Cited

U.S. PATENT DOCUMENTS 3,002,429　A　*　10/1961　Braun .................. F16C 19/183
　　　　　　　　　　　　　　　　　　　　　　384/616
7,982,455　B2 *　7/2011　Ito ........................ F16C 19/184
　　　　　　　　　　　　　　　　　　　　　　324/207.25
(Continued)

FOREIGN PATENT DOCUMENTS

DE　　112006000412 T5　　5/2008
DE　　102008038067 A1 *　2/2010　............ F16C 39/066
(Continued)

*Primary Examiner* — Phillip A Johnson

(74) *Attorney, Agent, or Firm* — Volpe Koenig

(57)　　　　　ABSTRACT

A double row angular contact ball bearing includes an outer ring and an inner ring having two axially interconnected ring elements. Two outer raceways are provided on the outer ring, and an inner raceway is provided on each ring element, balls running on the outer and inner raceways in two arrows. A ring section of a ring element protrudes axially beyond the outer ring, and a measuring body is provided on the outer cylindrical lateral surface of the ring section. A measuring device with a measuring means which detects the measuring body is provided on the outer ring, said measuring means being positioned radially adjacently to the measuring body and at a distance thereto across a measuring gap.

20 Claims, 2 Drawing Sheets

(51) Int. Cl.

| | |
|---|---|
| *F16C 33/58* | (2006.01) |
| *F16C 33/60* | (2006.01) |
| *F16C 41/00* | (2006.01) |
| *G01B 7/00* | (2006.01) |
| *G01P 7/00* | (2006.01) |

(52) U.S. Cl.

CPC ............ *F16C 41/007* (2013.01); *G01B 7/003* (2013.01); *F16C 2233/00* (2013.01); *F16C 2322/39* (2013.01)

(58) Field of Classification Search

CPC .... F16C 33/60; F16C 41/007; F16C 2233/00; F16C 2300/14; F16C 2322/39; G01P 3/36; G01P 3/443; G01M 13/04; G01B 7/003; G01D 11/02

See application file for complete search history.

(56) References Cited

U.S. PATENT DOCUMENTS

| | | | |
|---|---|---|---|
| 9,395,389 B2 | 7/2016 | Ozaki et al. | |
| 2009/0256550 A1 | 10/2009 | Ono et al. | |
| 2018/0223904 A1* | 8/2018 | Nagengast | .............. F16C 19/10 |
| 2020/0256705 A1* | 8/2020 | Rauh | ...................... G01D 11/02 |

FOREIGN PATENT DOCUMENTS

| | | | | |
|---|---|---|---|---|
| DE | 102011082221 A1 | | 3/2013 | |
| DE | 102014203517 A1 | | 8/2015 | |
| DE | 102015215834 A1 | | 11/2016 | |
| EP | 1342633 A2 | | 9/2003 | |
| EP | 1705089 A2 | | 9/2006 | |
| JP | 62297530 A | * | 12/1987 | |
| JP | H1123600 A | | 1/1999 | |
| JP | 2006153273 A | | 6/2006 | |
| JP | 2006266729 A | | 10/2006 | |
| WO | WO-2008046809 A1 | * | 4/2008 | ........... F16C 19/525 |

* cited by examiner

DOUBLE ROW ANGULAR CONTACT BALL BEARING

CROSS-REFERENCE TO RELATED APPLICATIONS

This application is the U.S. National Phase of PCT Appln. No. PCT/DE2023/100131 filed Feb. 17, 2023, which claims priority to DE 10 2022 106 014.4 filed Mar. 15, 2022, the entire disclosures of which are incorporated by reference herein.

TECHNICAL FIELD

The disclosure relates to a double-row angular contact ball bearing, comprising an outer ring and an inner ring consisting of two axially connected ring elements, wherein two outer raceways are provided on the outer ring and an inner raceway is provided on each ring element, on which outer and inner raceways balls run in two rows.

BACKGROUND

Such double-row angular contact ball bearings are used in a wide variety of areas wherever both radial and axial loads must be supported by the bearing. One application example is the use of such a double-row angular contact ball bearing as a rotary table bearing, which can be used to support a fast-rotating rotary table of a machine tool. The angular contact ball bearing enables the rotary table to rotate at high speeds, especially at speeds that cannot be achieved with axial-radial bearings normally used as rotary table bearings. The outer ring of the angular contact ball bearing is connected to the fixed machine frame or the like, while the inner ring is connected to the rotary table, for example via a pipe provided on the table side, on the outside of which the inner ring is arranged and through which the angular contact ball bearing passes.

In such an application as a rotary table bearing, it is often necessary to measure the rotational position of the rotary table relative to the fixed machine frame with high accuracy, i.e., the exact angular position. This requires the additional installation of a measuring device to measure the angle. This measuring device is preferably arranged in the plane of the angular contact ball bearing, through which the pipe of the rotary table passes as described, for which purpose a corresponding mounting must be provided on the frame side in order to be able to position the measuring device in the bearing plane. This is because in the bearing plane, any tilting within the bearing is minimal, whereas if the measuring device is arranged, for example, at the lower end of the pipe described, a significantly larger tilt angle can occur, which is why a measurement in this area would be too inaccurate. Irrespective of this, the integration of the measuring device in this way is disadvantageous in that, on the one hand, a corresponding effort is required with regard to the mounting and positioning of the measuring device inside the pipe in the bearing plane, as well as the fact that this naturally occupies the interior of the pipe, so that, for example, no cables or lines can be routed through the pipe or no oil distributor or the like can be integrated, since the center of the axis is blocked.

SUMMARY

The disclosure is based on the problem of specifying an angular contact ball bearing that is improved in comparison.

To solve this problem, according to the disclosure, an angular contact ball bearing of the type mentioned at the outset is provided, which is characterized in that a ring element with a ring section projects axially beyond the outer ring, wherein a measuring body is provided on an outer cylindrical lateral surface of the ring section, and that a measuring device with a measuring means which detects the measuring body is provided on the outer ring, said measuring means being positioned radially adjacent to and at a distance from the measuring body across a measuring gap.

The double-row angular contact ball bearing according to the disclosure is equipped with an integrated angle measuring device, which means that the angle measuring device is part of the angular contact ball bearing and is therefore mounted and positioned at the same time as the angular contact ball bearing is installed. To make this possible, the two-part inner ring is specifically designed at least with respect to one of its ring elements. The ring element has a ring section that projects axially beyond the outer ring, which makes it possible to arrange a measuring body on the outer cylindrical lateral surface of this ring section. This measuring body is an angle standard that can be detected via the measuring device, which enables extremely high-resolution and very precise angle determination. The measuring device is arranged on the outer ring and has a measuring means which is arranged radially adjacent to the measuring body across a very narrow gap so that the measuring means can detect the measuring body.

This angular contact ball bearing has a number of advantages. On the one hand, as described, it enables the rotary table to rotate at high to very high speeds, which is not possible with axial-radial bearings. In addition, the integration of the angle measuring system enables the pre-configuration of the angular contact ball bearing, after both the measuring body and the measuring device have already been mounted on the ring section of the inner ring and on the outer ring respectively at the factory, and the measuring gap provided between the measuring means and the measuring body can be set very precisely at the factory. This means that very complicated iterative setting and adjustment procedures during assembly, which often require several attempts, can be eliminated. Of course, the installation of the angle measuring system can also be eliminated due to the integration into the bearing itself.

And finally, due to the integration of the angle measuring system in the angular contact ball bearing itself, the axial center is not blocked, since the angle measuring system is ultimately arranged along the axial extension of the angular contact ball bearing, but not radially inside the angular contact ball bearing. As a result, the center of the axis is not blocked and can be used to pass through or integrate other components.

The measuring device itself is arranged on an axial ring surface of the outer ring, i.e., it is seated axially on the outer ring and is therefore inherently very close to the outer lateral surface of the ring section on which the measuring body is provided. According to a first variant of the disclosure, an adapter can be provided via which the measuring device is arranged on the outer ring. Using this adapter, it is possible to design the measuring device in a quasi-standardized manner and to install it on angular contact ball bearings of different dimensions, since any axial positioning differences of the measuring device with respect to the measuring body can be compensated for using the corresponding bearing-specific adapter. The measuring device or its housing therefore has a uniform size, wherein the actual axial position adjacent to the measuring body is set via the specific adapter.

As an alternative to using such an adapter, it is of course also conceivable to arrange the measuring device directly on the outer ring, in which case differently dimensioned measuring devices or measuring device housings must be provided for different bearing sizes.

The measuring device itself expediently has a housing in which the measuring means is accommodated. This housing simultaneously forms the interface to the adapter or directly to the outer ring, depending on the arrangement chosen. It has one or more corresponding bores for receiving fastening screws or similar. The housing is, for example, a plastic housing, allowing for simple manufacture.

The measuring means itself can be of different types or be designed for different measuring methods. It can be an inductive, optical or magnetoresistive measuring means; all measuring methods allow highly precise position detection. The measuring signals output by the measuring means are routed via suitable signal lines to a corresponding control device, which in particular controls the rotation operation of the rotary table. These signal lines can be an integral part of the measuring device. However, it is also conceivable that the measuring device is provided with appropriate interfaces, e.g. plug contacts, which allow corresponding signal transmission, be it analogue or serial.

As described, the measuring body is provided on the cylindrical outer lateral surface of the axially projecting ring section. Preferably, this measuring body is a ring shrunk onto the metal surface and provided with an angular scale, or comprises such a ring. The angular scale can be applied, for example, by etching the metallic ring. The ring is shrunk onto the ring section, for which purpose the ring is either slightly heated so that it expands, or the ring section is cooled so that the diameter of the ring section is slightly reduced, in which case both heating and cooling can occur. After slipping the ring over and allowing the temperature to equalize, the metal ring is finally seated immovably on the ring section, and the ring can then be covered with a protective covering.

As described, the angular contact ball bearing is preferably embodied or designed as a rotary table bearing or designed to be used as such. However, the use of the angular contact ball bearing is not limited to this. Rather, other applications are also conceivable in which highly precise angle detection of two components that can be rotated relative to each other is required.

In addition to the axial angular contact ball bearing itself, the disclosure further relates to a machine tool for machining a workpiece by removing material, comprising a machine frame and a table mounted thereon for rotation about an axis of rotation by means of an angular contact ball bearing of the type described above, for receiving the workpiece.

BRIEF DESCRIPTION OF THE DRAWINGS

The disclosure is explained below on the basis of exemplary embodiments with reference to the drawings. The drawings are schematic representations, in which.

DETAILED DESCRIPTION

Figure 1:
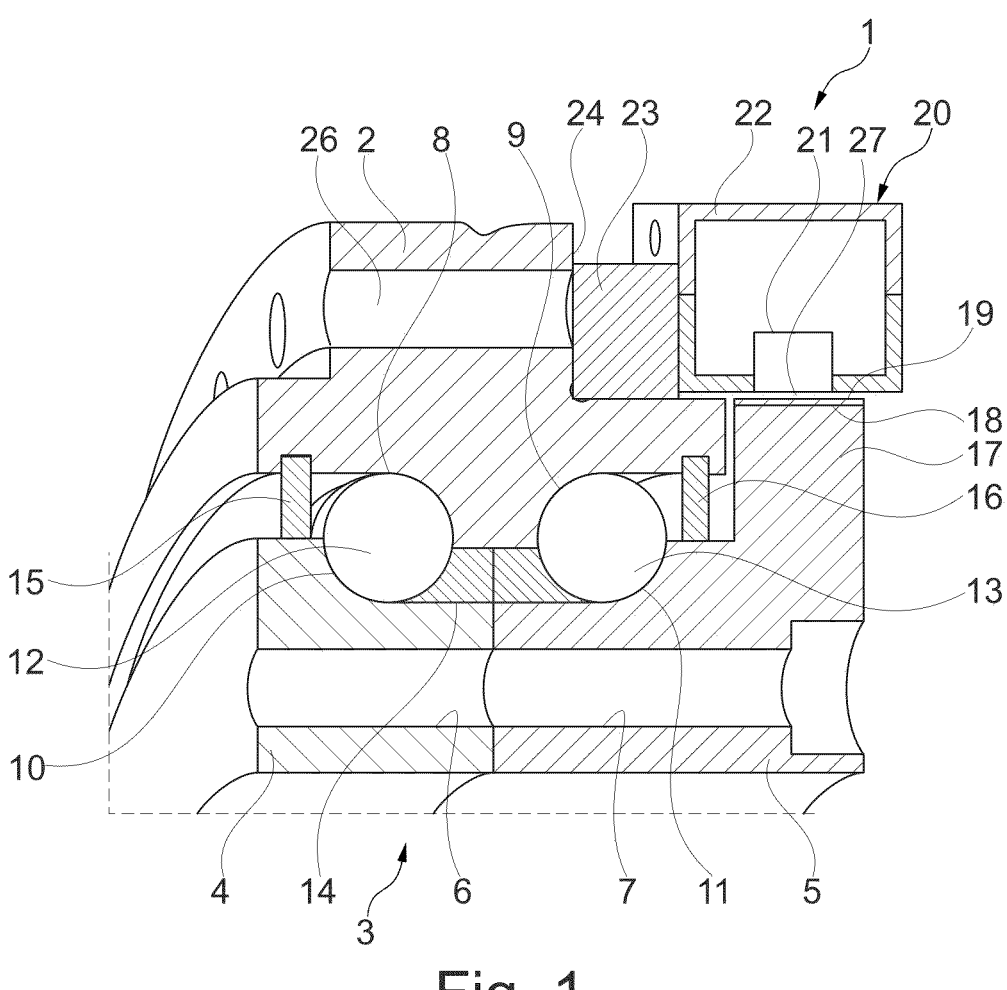
FIG. 1 shows a sectional view of an angular contact ball bearing according to the disclosure, as a partial perspective view.

FIG. 1 shows a perspective sectional partial view of an angular contact ball bearing 1 according to the disclosure, comprising an outer ring 2 and an inner ring 3, which consists of two axially interconnected ring elements 4, 5, which are axially connected to one another by means of suitable connecting screws which are screwed into corresponding receiving bores 6, 7 in the ring elements. Two outer raceways 8, 9 are formed on the outer ring, to which corresponding raceways 10, 11 formed on the two ring elements 4, 5 are assigned. Balls 12 of a first row of balls run on the raceways 8 and 10, and balls 13 of a second row of balls run on the raceways 9 and 11. The balls 12, 13 are guided and held in a common cage 14. Axially, the angular contact ball bearing 1 is closed by two sealing elements 15, 16 so that any lubricant is retained in the actual rolling region.

As FIG. 1 shows, the ring element 5 is axially wider than the ring element 4. It projects axially beyond the outer ring with a ring section 17, which is designed as a radially outward-projecting ring flange. A measuring body 19 is arranged on the outer lateral surface 18 of the ring section 17. This measuring body is a shrunk-on metal ring provided with an etched angle standard, which is optionally covered by a protective ring. This measuring body 19 is fixed in position and immovably connected to the ring section 17 and thus to the inner ring 3.

Furthermore, a measuring device 20 is provided, comprising a measuring means 21, shown here only in dashed lines, which is able to interact with the measuring body 19, i.e., to measure the angular scale, so that the actual rotational position of the inner ring 3 relative to the fixed outer ring 2 can be measured with high precision by a coupled control device. The measuring means 21 is a suitable measuring sensor which is designed for inductive, optical or magnetoresistive measurement.

The measuring means 21 is accommodated in a suitable housing 22, which is preferably a plastic component. To fix the measuring device 20 in position, an adapter 23 is provided which is seated axially on an axial ring surface 24 of the outer ring 2 and on which the measuring device 20 is in turn axially seated. For fastening purposes, the measuring device 20 or the housing 22 has a plurality of bores 25, just as the adapter 23 has corresponding bores aligned with the bores 25, through which fastening screws are guided, which are then screwed into corresponding bores 26 on the outer ring 2, as shown in FIG. 2.

The measuring device 20 or the housing 22 is preferably designed as a standardized component, so that the measuring device 20 can be arranged in identical form on angular contact ball bearings of different sizes. The axial position adjacent to the measuring body 19 is adjusted by the specifically designed adapter, which is wider or narrower depending on the required position. Via the connection of the measuring device 20 to the adapter 23, the measuring gap 27 between the measuring means 21 and the measuring body 19 is simultaneously defined and set. Due to the integration of the entire angle measuring system consisting of the measuring body 19 and the measuring device 20 in or on the angular contact ball bearing 1 itself, this angle measuring system can already be pre-installed at the factory when the bearing is assembled so that no assembly work of this angle measuring system on site is necessary. In addition, the exact positioning of the measuring means 21 with respect to the measuring body 19 as well as the width of the measuring gap 27 can be set and checked at the factory so that the finished angular contact ball bearing 1 only needs to be installed.

Figure 2:
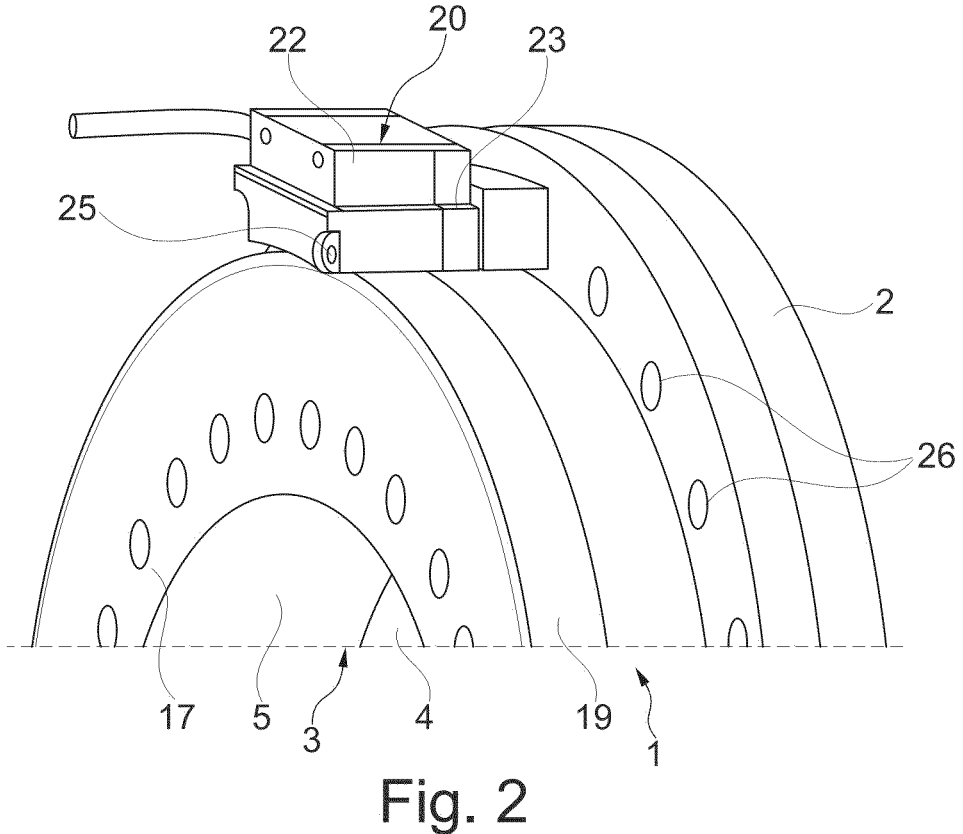
FIG. 2 shows a partial perspective view of the angular contact ball bearing from FIG. 1, uncut.

As FIGS. 1 and 2 show, the angular contact ball bearing 1 is an extremely compact unit despite the integration of the angle measuring system, which has only a negligible additional radial size and only shows a slight axial extension resulting from the axial projection of the ring section 17 and the axial arrangement of the measuring device 20. The integration into a machine frame is therefore easily possible. The figures also clearly show that no space located radially within the inner ring 2 is occupied by the angle measuring system, so that in the assembly situation third-party objects such as cables, lines, hoses or other items can easily be laid or installed in this area.

The angular contact ball bearing 1 is preferably a rotary table bearing which is installed, for example, in a machine tool for machining a workpiece by removing material. Its outer ring 2 is connected in a fixed position to a machine frame or the like, either directly or indirectly, while its inner ring 3 is connected to a table which is mounted so as to be rotatable about an axis of rotation for holding a workpiece, also either directly or indirectly.

LIST OF REFERENCE SYMBOLS

1 Axial angular contact ball bearing
2 Outer ring
3 Inner ring
4 Ring element
5 Ring element
6 Receiving hole
7 Receiving hole
8 Raceway
9 Raceway
10 Raceway
11 Raceway
12 Ball
13 Ball
14 Cage
15 Sealing elements
16 Sealing elements
17 Ring section
18 Lateral surface
19 Dimensional measure
20 Measuring device
21 Measuring means
22 Housing
23 Adapter
24 Ring surface
25 Bore
26 Bore
27 Measuring gap

The invention claimed is:

1. A double-row angular contact ball bearing, comprising:
an outer ring and an inner ring having two ring elements axially connected to one another,
wherein two outer raceways are provided on the outer ring and an inner raceway is provided on each ring element, wherein two rows of balls run on the outer and inner raceways, and one of the two ring elements has a ring section that projects axially beyond the outer ring, the ring section is a radially outward-projecting ring flange that at least partially radially overlaps the outer ring; and
wherein a measuring body is provided on an outer cylindrical lateral surface of the ring section, and a measuring device with a measuring means which detects the measuring body is provided on the outer ring, said measuring means being positioned radially adjacent to the measuring body and at a distance thereto across a measuring gap.

2. The angular contact ball bearing according to claim 1, wherein the measuring device is arranged on an axial ring surface of the outer ring.

3. The angular contact ball bearing according to claim 1, wherein an adapter is provided, via which the measuring device is arranged on the outer ring.

4. The angular contact ball bearing according to claim 1, wherein the measuring device is arranged directly on the outer ring.

5. The angular contact ball bearing according to claim 1, wherein the measuring device has a housing in which the measuring means is accommodated.

6. The angular contact ball bearing according to claim 1, wherein the measuring means is an inductive or optical or magnetoresistive measuring means.

7. The angular contact ball bearing according to claim 1, wherein the measuring body is a ring shrunk onto the lateral surface and provided with an angular scale.

8. The angular contact ball bearing according to claim 1, wherein the angular contact ball bearing is a rotary table bearing.

9. The angular contact ball bearing according to claim 1, wherein the two ring elements are axially connected to one another by connecting screws which are screwed into corresponding receiving bores in the ring elements.

10. The angular contact ball bearing according to claim 1, wherein the ring element having the ring section is axially wider than the ring element without the ring section.

11. A double-row angular contact ball bearing, comprising:
an outer ring including two outer raceways;
an inner ring having first and second ring elements axially connected to one another, each of the first and second ring elements including an inner raceway, wherein the second ring element is axially wider than the first ring element, and the second ring element includes a ring section that projects axially beyond the outer ring;
two rows of balls run on the outer and inner raceways;
a measuring body is provided on an outer cylindrical lateral surface of the ring section; and
a measuring device with a measuring means configured to detect the measuring body is provided on the outer ring, the measuring means being positioned radially adjacent to the measuring body and at a distance thereto across a measuring gap.

12. The angular contact ball bearing according to claim 11, wherein the ring section is a radially outward-projecting ring flange that at least partially radially overlaps the outer ring.

13. The angular contact ball bearing according to claim 11, wherein the first and second ring elements are axially connected to one another by connecting screws which are screwed into corresponding receiving bores in the first and second ring elements.

14. The angular contact ball bearing according to claim 11, wherein the measuring device is arranged on an axial ring surface of the outer ring.

15. The angular contact ball bearing according to claim 11, wherein an adapter is provided, via which the measuring device is arranged on the outer ring.

16. The angular contact ball bearing according to claim 11, wherein the measuring device is arranged directly on the outer ring.

17. The angular contact ball bearing according to claim 11, wherein the measuring device has a housing in which the measuring means is accommodated.

18. The angular contact ball bearing according to claim 11, wherein the measuring means is an inductive or optical or magnetoresistive measuring means.

19. The angular contact ball bearing according to claim 11, wherein the measuring body is a ring disposed on the lateral surface and provided with an etched angular scale.

20. The angular contact ball bearing according to claim 11, wherein the angular contact ball bearing is a rotary table bearing.

\* \* \* \* \*